US009069068B2

(12) United States Patent
Webb et al.

(10) Patent No.: US 9,069,068 B2
(45) Date of Patent: Jun. 30, 2015

(54) SYSTEMS AND METHODS FOR UPDATING HIL AND HFOM INTEGRITY COMPONENTS WHEN NOT EXTRAPOLATING POSITION DATA

(75) Inventors: Barry D. Webb, Shawnee, KS (US); John Savoy, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 912 days.

(21) Appl. No.: 13/240,862

(22) Filed: Sep. 22, 2011

(65) Prior Publication Data
US 2013/0076563 A1  Mar. 28, 2013

(51) Int. Cl.
| | |
|---|---|
| *G01S 19/20* | (2010.01) |
| *G01S 19/14* | (2010.01) |
| *G01S 5/00* | (2006.01) |
| *G01S 13/78* | (2006.01) |

(52) U.S. Cl.
CPC ............. *G01S 19/14* (2013.01); *G01S 19/20* (2013.01); *G01S 5/0027* (2013.01); *G01S 13/782* (2013.01)

(58) Field of Classification Search
CPC .......... G01S 19/20; G01S 19/14; G01S 5/00; G01S 13/78
USPC .................................................... 342/357.58
See application file for complete search history.

(56) References Cited

U.S. PATENT DOCUMENTS

| | | | |
|---|---|---|---|
| 2002/0032528 A1 | 3/2002 | Lai | |
| 2007/0024495 A1 | 2/2007 | Conner et al. | |
| 2009/0243929 A1* | 10/2009 | Sengupta et al. | 342/357.15 |
| 2010/0052973 A1* | 3/2010 | Fabre et al. | 342/30 |

OTHER PUBLICATIONS

Serway, R. Vuille, C, Essentials of College Physics, Cengage Learning, 2007, p. 28, Retrieved from the Interent Aug. 6, 2014 at <URL: http://books.google.com/books?id=8n4NCyRgUMEC&source=gbs_navlinks_s>.*
Owusu, Kojo, Aeronautical Surveillance Panel (ASP), Doc 9871 CP to add guidance material on ADS-B position quality indicators, (pp. 1-6), Montreal Oct. 15-19, 2007.
Fritz, Amy; Precice Position Service to Satisfy ADS-B Out Mandate, The MITRE Corporation, Bedford, Massachusetts, 978-1-4577-0592-5/11/$26.00 (C) 2011 IEEE, 3 pages.
Dr. Michael Garcia, ITT, Recent Updates to the Surveillance Broadcast Services (SBS) System, Federal Aviation Administration; BNSDOCID_XP_31953260A_1; 23 pages.

* cited by examiner

*Primary Examiner* — Harry Liu
(74) *Attorney, Agent, or Firm* — Shumaker & Sieffert, P.A.

(57) ABSTRACT

Systems and methods for reporting position and associated integrity during times when extrapolation is not taking place as accurately as possible. In one example, a processing device deactivates extrapolation of global positioning system (GPS) position information based on a predefined condition, receives ground speed information, and HFOM and HIL values from a global position system (GPS); calculates inflated HFOM and HIL values based on the received HFOM and HIL values and the ground speed and generates an automatic dependent surveillance-broadcast (ADS-B) OUT signal based on the calculated inflated HFOM and HIL values. A transmitter coupled to the processing device transmits the generated ADS-B OUT signal.

20 Claims, 3 Drawing Sheets

SYSTEMS AND METHODS FOR UPDATING HIL AND HFOM INTEGRITY COMPONENTS WHEN NOT EXTRAPOLATING POSITION DATA

BACKGROUND OF THE INVENTION

The regulatory requirements Radio Technical Commission for Aeronautics (RTCA), Inc. (RTCA/DO-260B) for automatic dependent surveillance-broadcast (ADS-B) OUT operation require the following:

"The time of applicability to which the encoded latitude and longitude in an Airborne or Surface Position Messages are computed shall be within 100 milliseconds of the time of transmission."

"The position register shall be reloaded with position data at intervals that are no more than 200 milliseconds apart. The position being loaded into the Register shall have a time of applicability that is never more than 200 milliseconds different from any time during which the Register holds that data."

One issue is that the processing for extrapolating global positioning system (GPS) position in the polar region is extensive and taxing for microcontrollers or processors without floating point capability.

SUMMARY OF THE INVENTION

The present invention provides systems and methods for reporting position and associated integrity during times when extrapolation is not taking place as accurately as possible. In one example, a processing device deactivates extrapolation of global positioning system (GPS) position information based on a predefined condition, receives ground speed information, and HFOM and HIL values from a global position system (GPS); calculates inflated HFOM and HIL values based on the received HFOM and HIL values and the ground speed and generates an automatic dependent surveillance-broadcast (ADS-B) OUT signal based on the calculated inflated HFOM and HIL values. A transmitter coupled to the processing device transmits the generated ADS-B OUT signal.

In one aspect of the invention, the processing device and the transmitter are located on a vehicle such as an aircraft.

In another aspect of the invention, the predefined condition includes the position information which indicates that the aircraft is within a predefined polar region.

In still another aspect of the invention, the processing device determines an unextrapolated period. The calculation of the inflated HFOM and HIL values is further based on the determined unextrapolated period.

BRIEF DESCRIPTION OF THE DRAWINGS

Preferred and alternative embodiments of the present invention are described in detail below with reference to the following drawings.

DETAILED DESCRIPTION OF THE INVENTION

The present invention will not extrapolate global positioning system (GPS) position when in a polar region or as desired. Numerous extended squitter fields regarding the integrity of position (i.e., Type Code, Navigation Integrity Category (NIC), NIC Supplement A, B, C, and Navigation Accuracy Category for Position (NACp)) are based on horizontal integrity level (HIL) and horizontal figure of merit (HFOM) values received from the GPS. Thus, when GPS is not extrapolated, the integrity of the position is also affected. The present invention reports the position and associated integrity during times when extrapolation is not taking place (in polar region or not) as accurately as possible to minimize the impact of any deviation.

Figure 1:
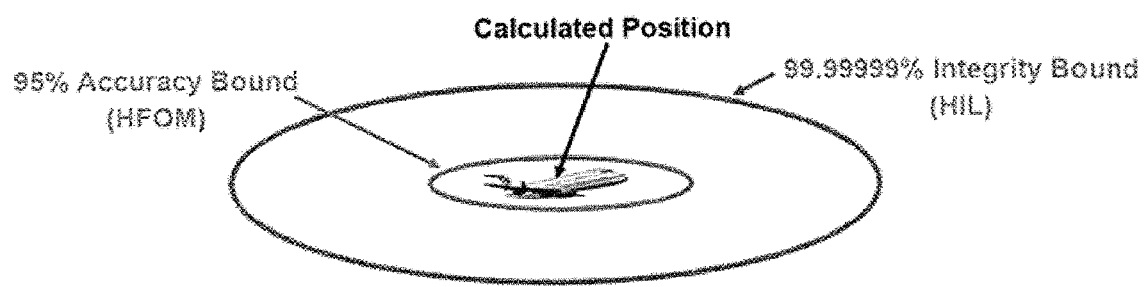
FIG. 1 shows a representation of GPS values according to the prior art.

The following provides background on the GPS terms—HIL (Horizontal Integrity Limit) and HFOM (Horizontal Figure of Merit) terms (FIG. 1):

HFOM (Horizontal Figure of Merit) represents horizontal navigation accuracy (95% confidence level)

HIL (Horizontal Integrity Limit) represents maximum navigation error (99.99999% confidence level).

RTCA/DO-229D section 1.7.2 defines HIL as "The HIL is the radius of a circle in the horizontal plane (the local plane tangent to the WGS-84 ellipsoid), with its center being at the true position, that describes the region assured to contain the indicated horizontal position . . . . It is a function of the satellite and user geometry and the expected error characteristics . . . ."

HFOM is defined as "The HFOM is the radius of a circle in the horizontal plane (the local plane tangent to the WGS-84 ellipsoid), with its center being at the true position, the describes the region assured to contain the indicated horizontal position with at least a 95% probability under fault-free conditions at the time of applicability.

Figure 2:
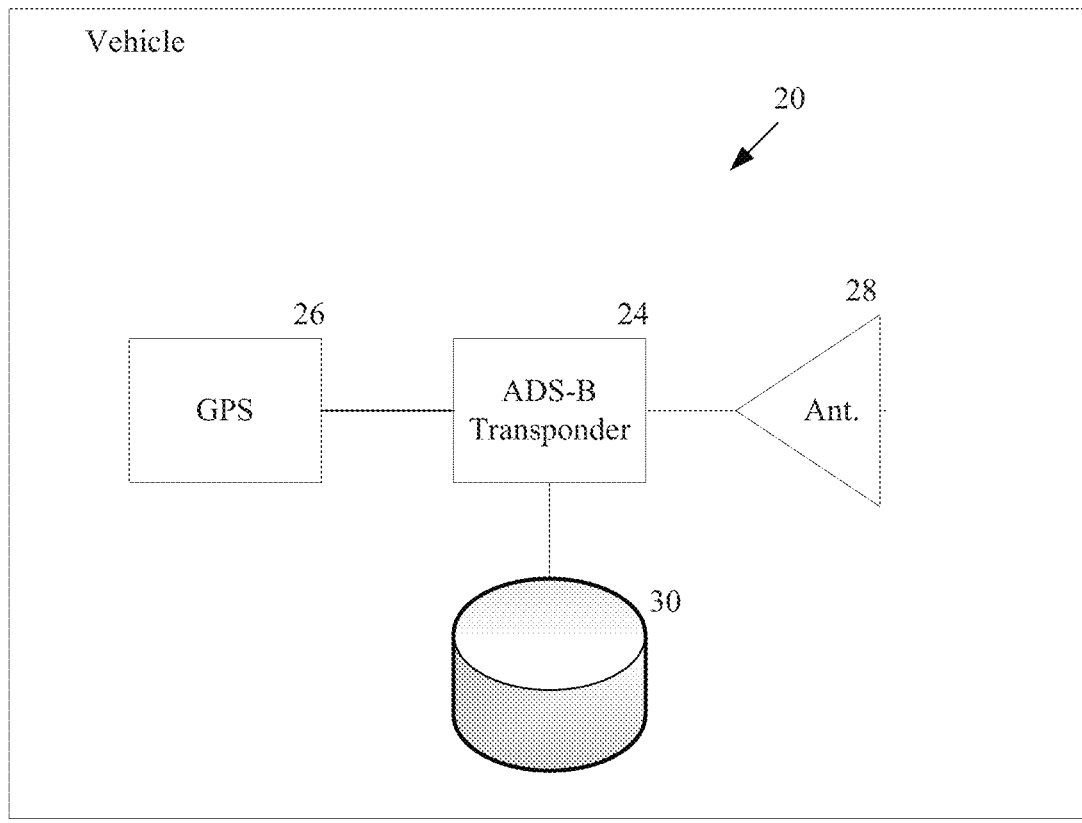
FIG. 2 is a schematic diagram of an exemplary system formed in accordance with the present invention.

FIG. 2 illustrates an exemplary system 20 used in a vehicle for improving reporting of position information during times when extrapolation of position information is not possible or intentionally disabled. The system 20 includes an automatic dependent surveillance-broadcast (ADS-B) transponder 24 that is in signal communication with a positioning device (global positioning system (GPS)) 26, an antenna 28, and a memory device 30. The transponder 24 inflates the integrity values (HIL, HFOM) used by an internal ADS-B OUT component based on the latest received integrity values (HIL, HFOM) and ground speed reported by the GPS 26. The transponder 24 also accounts for the unextrapolated period (GPS data rate) and possible error in a ground speed value (defined as 10 m/s) received from the GPS 26. The transponder 24 inflates the integrity values (HIL, HFOM) as minimally as possible.

Figure 3:
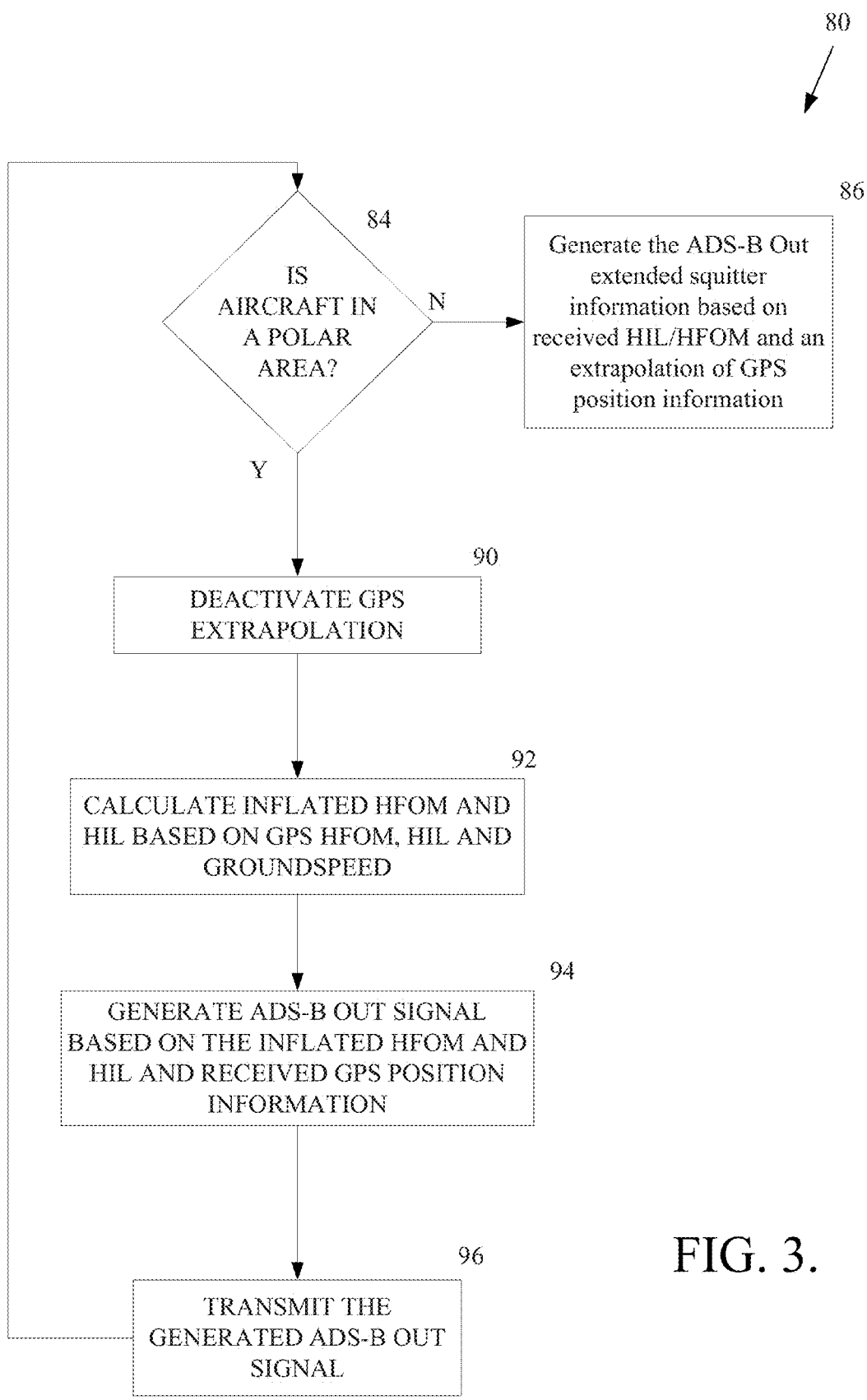
FIG. 3 is a flowchart of an exemplary process performed by the system shown in FIG. 2.

FIG. 3 is a flowchart of an exemplary process 80 performed by the transponder 24. First, at a decision block 84, the transponder 24 determines, based on position information received from the GPS 26, whether the aircraft is in a predefined polar area. If the transponder 24 determines that the vehicle (or aircraft) is not in a polar area, then the transponder 24 generates the ADS-B OUT extended squitter information based on the received integrity values (HIL, HFOM) and an extrapolation of the GPS position information.

If, at the decision block 84, the transponder 24 determines that the aircraft is in a polar area, then GPS position information extrapolation is deactivated (or results of GPS position information extrapolation are ignored) at a block 90. Then, at a block 92, the transponder 24 calculates inflated integrity values (HIL, HFOM) based on the actual integrity values HIL, HFOM received from the GPS 26 and current ground speed information also received from the GPS 26. Then, at a block 94, the transponder 24 generates and ADS-B OUT signal based on the calculated inflated integrity values HIL, HFOM and position information received from the GPS 26.

Finally, at a block 96, the transponder 24 sends the generated ADS-B OUT signal to the antenna 28 for transmission. The process 80 then returns to the decision block 84 to repeat, as necessary.

The ADS-B OUT component of the transponder 24 makes use of the inflated HIL and HFOM when populating fields in extended squitter in the polar areas.

The NAC$_P$ subfield in Aircraft Operational Status (65$_H$) Squitter messages is affected by new HFOM.

The following subfields in the listed squitters are affected by received HIL:
When airborne:
Airborne Position (05$_H$)
Format Type/Navigation Integrity Category (NIC) subfield
NIC Supplement B subfield
Aircraft Operational Status (65$_H$) Squitters
NIC Supplement A subfield
When on the surface:
Surface Position (06$_H$) Squitter
Format Type/Navigation Integrity Category (NIC) subfield
Aircraft Operational Status (65$_H$) Squitters
NIC Supplement A subfield
NIC Supplement C subfield The following is an example using a GPS received HIL of 0.15 nm (or 277.8 m) and a ground speed of 300 kts (or 154.33 m/s) with a 1 Hz GPS sensor.

HIL$_{Inflated}$(m)=HIL$_{GPS}$(m)+(Ground Speed(m/s)+ Ground Speed Error(m/s))* Unextrapolated Period(s)

Ground speed error is dependent on the quality of the positioning source. GPS receivers are generally grouped into two general categories—equipment providing velocity accuracy better than 10 m/s and those providing accuracy better than 2 m/s. This value can be derived from assumptions about the accuracy of the GPS source.

Unextrapolated time is the worst case transmission time of the GPS sensor less the time of applicability allotment allowed in the first quoted statement in the background section (i.e. 100 msec.). In the case of a 1 Hz GPS sensor, the worst case transmission time is 1.2 sec and therefore the unextrapolated time would be 1.1 sec. A 5 Hz GPS sensor has a worst cast transmission time of 240 msec. In this case, the multiplier in the second equation is modified to 0.140 s (240 msec.−100 msec.=140 msec.)

An example using a 1 Hz GPS sensor results in the following modification to HIL.

458.6 m=277.8 m+(154.33 m/s+10 m/s)*1.1 s

The same example with a 5 Hz GPS sensor results in the following modification to HIL:

294.2 m=277.8 m+(154.33 m/s+10 m/s)*0.14 s

While the present invention is defined only in the polar region, the same method for inflating integrity values could be used more broadly in other applications if acceptable.

The following are examples squitter field data in normal (prior art) mode and the inflated (present invention) mode. In these examples a 1 Hz GPS source (maximum update interval 1200 ms) is used. The airborne cases assume ground speed of 300 kts (154.33 m/s) while on ground cases assume ground speed of 30 kts (15.433 m/s).

|  | (in meters) | | | | Type Code | |
|---|---|---|---|---|---|---|
|  | HIL$_{GPS}$ | HFOM$_{GPS}$ | HIL$_{inflated}$ | HFOM$_{inflated}$ | Normal | Inflated |
| Airborne | 32 (*75) | 15 | 212.8 | 195.8 | 11 | 12 |
| Airborne | 277.8 | 140 | 458.7 | 320.8 | 12 | 13 |
| On Ground | 32 (*75) | 15 | 60 (*75) | 43 | 7 | 7 |
| On Ground | 277.8 | 140 | 306 | 168 | 8 | 8 |

|  | NIC | | NIC Sup-A | | NIC Sup-B | | NIC Sup-C | |
|---|---|---|---|---|---|---|---|---|
|  | Normal | Inflated | Normal | Inflated | Normal | Inflated | Normal | Inflated |
| Airborne | 8 | 7 | 0 | 0 | 0 | 0 | n/a | n/a |
| Airborne | 7 | 6 | 0 | 0 | 0 | 1 | n/a | n/a |
| On Ground | 8 | 8 | 0 | 0 | n/a | n/a | 0 | 0 |
| On Ground | 7 | 7 | 1 | 1 | n/a | n/a | 1 | 1 |

|  | NACP | |
|---|---|---|
|  | Normal | Inflated |
| Airborne | 9 | 6 |
| Airborne | 7 | 6 |
| On Ground | 9 | 8 |
| On Ground | 7 | 7 |

(*) Advisory Circular (AC) No. 20-165 (a Federal Aviation Administration (FAA) document on the airworthiness approval of ADS-B Out systems) states the transponder shall limit the value of HIL to ≥75 m in cases when the GPS is providing HIL values less than 75 meters (m).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
deactivating, by a processing device, in response to a predefined condition, a process of performing extrapolation of position information based on the predefined condition by a position source system, without deactivating the position source system;
receiving, by the processing device, ground speed information, and horizontal integrity level (HIL) and horizontal figure of merit (HFOM) values from the position source system;
calculating, by the processing device, after deactivating the process of performing extrapolation of position information, inflated HFOM and HIL values based on the received HFOM and HIL values and the ground speed information; and
generating, by the processing device, an automatic dependent surveillance-broadcast (ADS-B) Out signal based on the calculated inflated HFOM and HIL values.

2. The method of claim 1, wherein the processing devise comprises an ADS-B transponder.

3. The method of claim 1, wherein the processing device is located on a vehicle.

4. The method of claim 3, wherein the vehicle comprises an aircraft.

5. The method of claim 4, wherein the predefined condition comprises receiving, by the processing device, position information indicating that the aircraft is within a predefined polar region.

6. The method of claim 1, further comprising determining an unextrapolated period, wherein calculating the inflated HFOM and HIL values is further based on the determined unextrapolated period.

7. The method of claim 1, wherein the position source system comprises a global positioning system (GPS).

8. The method of claim 1, further comprising transmitting the generated ADS-B OUT signal based on the calculated inflated HFOM and HIL values from a transmitter coupled to the processing device.

9. A system comprising:
a means for deactivating, in response to a predefined condition, a process of performing extrapolation of position information based on the predefined condition by a position source system, without deactivating the position source system;
a means for receiving ground speed information, and horizontal integrity level (HIL) and horizontal figure of merit (HFOM) values from the position source system;
a means for calculating, after the means for deactivating deactivates the process of performing extrapolation of position information by the position source system, inflated HFOM and HIL values based on the received HFOM and HIL values and the ground speed; and
a means for generating an automatic dependent surveillance-broadcast (ADS-B) Out signal based on the calculated inflated HFOM and HIL values.

10. The system of claim 9, wherein the system is located on a vehicle.

11. The system of claim 10, wherein the vehicle comprises an aircraft.

12. The system of claim 11, wherein the predefined condition comprises the receiving position information indicating that the aircraft is within a predefined polar region.

13. The system of claim 9, further comprising a means for determining an unextrapolated period, wherein the means for calculating inflated HFOM and HIL values calculates further based on the determined unextrapolated period.

14. The system of claim 9, further comprising a means for transmitting the generated ADS-B Out signal based on the calculated inflated HFOM and HIL values.

15. A system located in a vehicle, the system comprising:
a positioning system configured to provide ground speed information and horizontal integrity level (HIL) and horizontal figure of merit (HFOM) values;
a processing device configured to:
deactivate, in response to a predefined condition, a process of performing extrapolation of position information based on the predefined condition by a positioning system, without deactivating the positioning system;
receive ground speed information and horizontal integrity level (HIL) and horizontal figure of merit (HFOM) values from the positioning system;
after deactivating the process of performing extrapolation of position information by the positioning system, calculate inflated HFOM and HIL values based on the received HFOM and HIL values and the ground speed; and
generate an automatic dependent surveillance-broadcast (ADS-B) Out signal based on the calculated inflated HFOM and HIL values.

16. The system of claim 15, wherein the vehicle comprises an aircraft.

17. The system of claim 15, wherein the positioning system comprises a global position system (GPS).

18. The system of claim 16, wherein the predefined condition comprises receiving position information indicating that the aircraft is within a predefined polar region.

19. The system of claim 15, wherein the processing device is further configured to determine an unextrapolated period, wherein the inflated HFOM and HIL values are further calculated based on the determined unextrapolated period.

20. The system of claim 15, further comprising a transmitter configured to transmit the generated ADS-B Out signal based on the calculated inflated HFOM and HIL values.

\* \* \* \* \*

UNITED STATES PATENT AND TRADEMARK OFFICE
CERTIFICATE OF CORRECTION

PATENT NO. : 9,069,068 B2
APPLICATION NO. : 13/240862
DATED : June 30, 2015
INVENTOR(S) : Barry D. Webb and John Savoy It is certified that error appears in the above-identified patent and that said Letters Patent is hereby corrected as shown below:

IN THE CLAIMS:
Col. 5, Claim 12, Line 29: says "comprises the receiving position", should say --comprises receiving position--

Signed and Sealed this
Twenty-sixth Day of July, 2016

Michelle K. Lee
*Director of the United States Patent and Trademark Office*